April 19, 1960

T. J. WOJCIAK ET AL 2,933,591

OFFSET NOZZLE TORCH

Filed Sept. 22, 1958

INVENTORS.
THADDEUS J. WOJIAK &
PETER R. SCHAEFER
BY

Richard S. Shreve
ATTORNEY.

United States Patent Office 2,933,591
Patented Apr. 19, 1960

2,933,591
OFFSET NOZZLE TORCH

Thaddeus J. Wojciak, Elizabeth, and Peter R. Schaefer, Newark, N.J., assignors to Union Carbide Corporation, a corporation of New York Application September 22, 1958, Serial No. 762,319

5 Claims. (Cl. 219—130)

This invention relates to offset nozzle torches and, more particularly, to torches of the character shown in the copending application of Wojciak and Schaefer, Serial No. 659,251, filed May 15, 1957.

In that application visibility of the arc and access of the torch to the work were facilitated by bending the barrel of the nozzle. According to the present invention, these and other advantages are accomplished by providing a straight barrel, and rotating the barrel in a clamp-on pistol grip handle to adjust the eccentricity of the nozzle.

Figure 1:
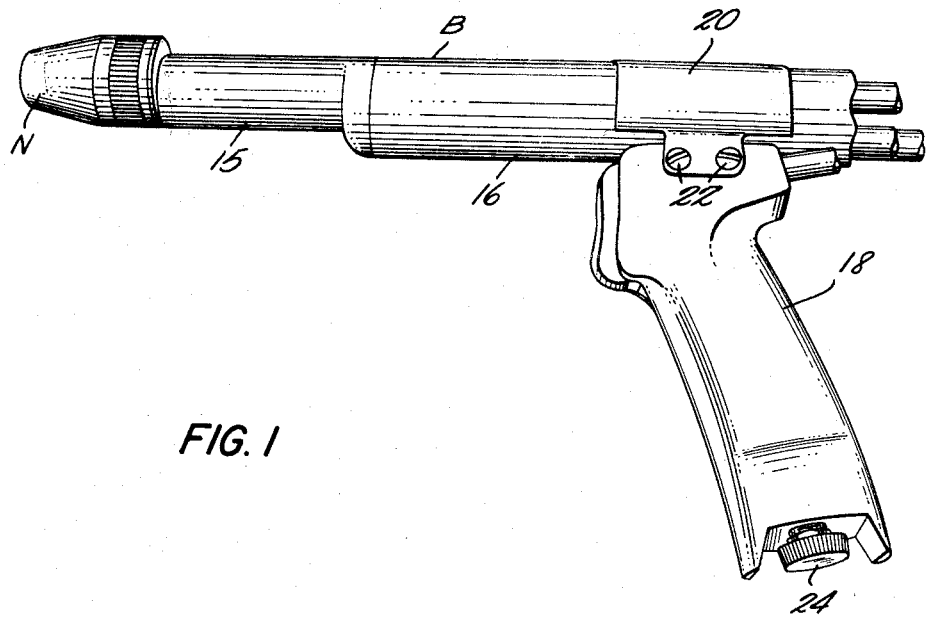
Fig. 1 is a side elevation of the torch.
Figure 2:
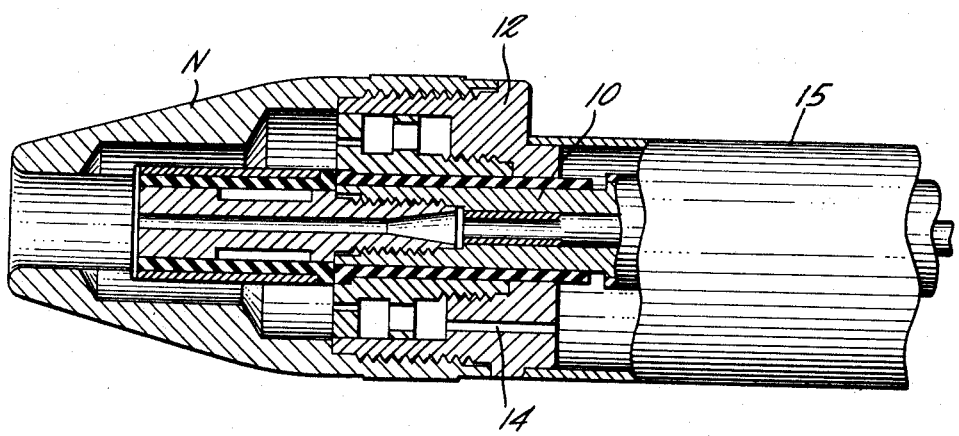
Fig. 2 is an enlarged axial section through the nozzle end of Fig. 1.

The torch comprises a barrel B in which is eccentrically mounted an electrode wire guide tube 10. A gas directing nozzle N is mounted on the front end of the barrel B concentric to the guide 10, but offset with respect to the barrel B.

Interposed between the guide tube 10 and the nozzle N is a gas manifold 12 for supplying powder laden gas to the nozzle N, and having an inlet 14 inside the barrel B and eccentric with respect to the guide tube 10.

The barrel B comprises a front portion 15 of smaller diameter than the nozzle N and the manifold 12, and an eccentric rear portion 16 of greater diameter than the front portion 15.

The torch is provided with a handle 18 extending laterally from the barrel B and releasably secured thereto to permit rotary adjustment of the eccentricity of the nozzle as well as lateral adjustment for the positioning of the operator's hand. The handle 18 is preferably a pistol grip and a clamp 20 secured to the handle, preferably comprising a sheet metal strap, extends around the rear portion 16 and is tightened by screws 22. This thin strap 20 affords the greatest strength with the least mass, so as to avoid bulkiness of the torch.

The end of the handle 18 is recessed to receive the knob 24 of a welding current vernier control mounted inside the handle, so that the welding current can be adjusted while the torch is held by the handle, without interrupting the welding operation. The recessing of the knob 24 shields it from shock and abuse.

When welding downhand, visibility of the weldment may be greatly increased by merely rotating the nozzle offset so as to provide better visibility of the welding zone. Since the torch is mounted in a clamp-on pistol grip, the torch may be rotated 360° relative to the pistol grip. The pistol grip provides good operator comfort by said convenient hand position for downhand and fillet welding applications. The length of the barrel is greater than the length of the pistol grip, so that the pistol grip is remote from the nozzle end of the torch, thereby spacing the hand of the operator from the heat of the welding zone.

What is claimed is:

1. Gas shielded arc torch comprising a barrel, an electrode wire guide tube eccentrically mounted in said barrel, a gas directing nozzle mounted on the end of said barrel concentric with said guide tube but offset with respect to said barrel, a handle extending laterally from said barrel, and releasable means for securing said barrel to said handle to permit rotary adjustment of the eccentricity of said nozzle.

2. Gas shielded arc torch comprising a barrel having a front portion and a rear portion eccentric to said front portion, a gas directing nozzle mounted on said front portion and offset with respect thereto, a pistol grip extending laterally from said barrel, and a clamp on said pistol grip releasably gripping said eccentric rear portion of said barrel to permit rotary adjustment of the eccentricity of said nozzle, said barrel being of greater length than said handle, to space the hand of the operator from the heat of the arc.

3. Gas shielded arc torch comprising a barrel having a front portion and a rear portion eccentric to said front portion, an electrode wire guide tube mounted in said barrel, a gas directing nozzle mounted on said front portion concentric with said guide tube but offset with respect to said barrel, a handle extending laterally from said barrel, a sheet metal strap on said handle surrounding said eccentric rear portion of said barrel and releasable to permit rotary adjustment of the eccentricity of said nozzle, and a shielded welding current control knob recessed in the end of said handle to permit adjustment of the welding current while the torch is held by said handle.

4. Gas shielded arc torch comprising a barrel, an electrode wire guide tube mounted in said barrel, an annular gas manifold mounted on the end of said barrel concentric with said guide tube but eccentric to said barrel, a gas directing nozzle surrounding said manifold and receiving gas therefrom, a handle extending laterally from said barrel, and a clamp on said handle gripping said barrel to permit rotary adjustment of the eccentricity of said nozzle.

5. Gas shielded arc torch comprising a barrel, an electrode wire guide tube mounted in said barrel, an annular gas manifold mounted on the end of said barrel concentric with said guide tube but eccentric to said barrel, a gas supply inlet inside said barrel but outside of said wire guide tube for supplying gas to said manifold, a gas directing nozzle surrounding said manifold and receiving gas therefrom, a handle extending laterally from said barrel, and a clamp on said handle gripping said barrel to permit rotary adjustment of the eccentricity of said nozzle.

References Cited in the file of this patent

UNITED STATES PATENTS 2,659,796     Anderson _____ Nov. 17, 1953